United States Patent

Haugwitz et al.

[15] 3,665,007

[45] May 23, 1972

[54] THIAZOLO [3,4-A] BENZIMIDAZOLES AND DERIVATIVES THEREOF

[72] Inventors: Rudiger D. Haugwitz, Highland Park; Venkatachala Lakshmi Narayanan, North Brunswick, both of N.J.

[73] Assignee: E. R. Squibb & Sons, Inc., Princeton, N.J.

[22] Filed: May 4, 1970

[21] Appl. No.: 34,552

[52] U.S. Cl............................260/306.7, 260/309.2, 424/200, 424/270

[51] Int. Cl. .......................................................C07d 99/06
[58] Field of Search..................................................260/306.7

Primary Examiner—Alex Mazel
Assistant Examiner—R. J. Gallagher
Attorney—Lawrence S. Levinson, Merle J. Smith, Theodore J. Criares, Donald J. Perella and Burton Rodney

[57] ABSTRACT

1-Imino-1H,3H-thiazolo[3,4-a]benzimidazoles and 1H,3H-thiazolo[3,4-a]benzimidazole-3-ones are provided which are useful as parasiticides and rodenticides.

7 Claims, No Drawings

THIAZOLO [3,4-A] BENZIMIDAZOLES AND DERIVATIVES THEREOF

This invention relates to the synthesis of a novel heterocyclic system; more specifically, it relates to 1-imino-1H,3H-thiazolo[3,4-a]benzimidazoles and 1H,3H-thiazolo[3,4-a]benzimidazole-3-ones of the structure

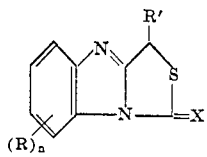

wherein
- R can be hydrogen, hydroxy, halo, nitro, lower alkyl, aryl lower alkyl, lower alkoxy, cyano, mercapto, thiocyano, amino, substituted amino, aryl, lower alkyl aryl;
- R' is lower alkyl, aryl lower alkyl, aryl, lower alkyl aryl or hydrogen;
- X is NH or oxygen; and
- n is 1 or 2.

The lower alkyl groups represented by the symbols R and R' are straight or branched chain aliphatic hydrocarbon radicals having up to seven carbon atoms, such as methyl, ethyl, propyl, isopropyl, butyl, isobutyl, t-butyl, amyl, hexyl, heptyl, and the like. The lower alkyl groups can include as substituents any of the aryl groups mentioned below.

With respect to R, the lower alkoxy groups represented thereby include straight and branched chain radicals of up to seven carbon atoms, corresponding to the above alkyl groups, e.g., methoxy, ethoxy, propoxy, isopropoxy, and the like. In addition, the term lower alkoxy includes lower alkylenedioxy groups wherein lower alkylene includes bivalent radicals of the kind mentioned above with respect to lower alkyl, such as methylenedioxy and ethylenedioxy. R can include each of the four halogens but chlorine and bromine are preferred. The substituted amino groups include mono- or di-lower alkylamino wherein lower alkyl is as defined above, such as methylamino, ethylamino, isopropylamino, heptylamino, dimethylamino, diethylamino, methylethylamino, methylbutylamino, ethyl i-propylamino and the like.

The term "aryl" includes monocyclic or bicyclic monovalent or bivalent aromatic ring systems such as phenyl or naphthyl, benz and naphtho. These aryl radicals can include as substituents any of the lower alkyl groups included within the definition of R and R'.

It is to be understood that where more than one R substituent is present, each R may be the same or different.

Preferred are those compounds wherein R and R' are hydrogen, X is NH or O, and n is 1.

Exemplary of compounds falling within the present invention include the following:

1. 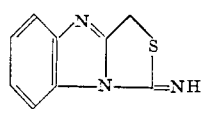

2. 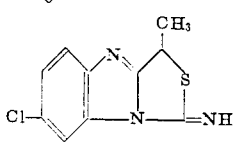

3. 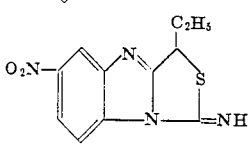

4. 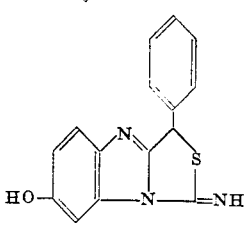

5. 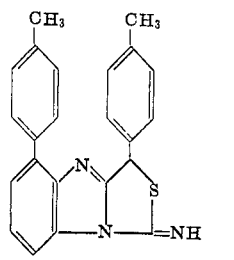

6. 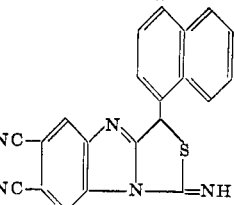

7. 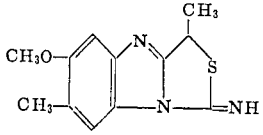

8. 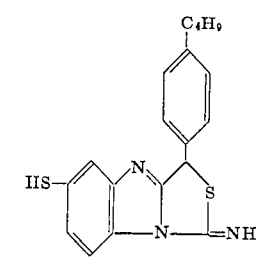

9. 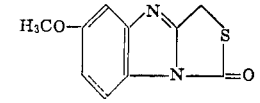

10. 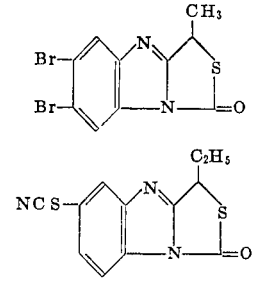

11. 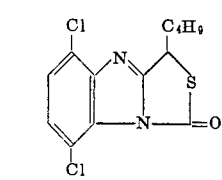

12. 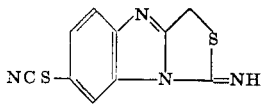

13. 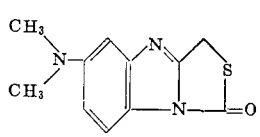

14. 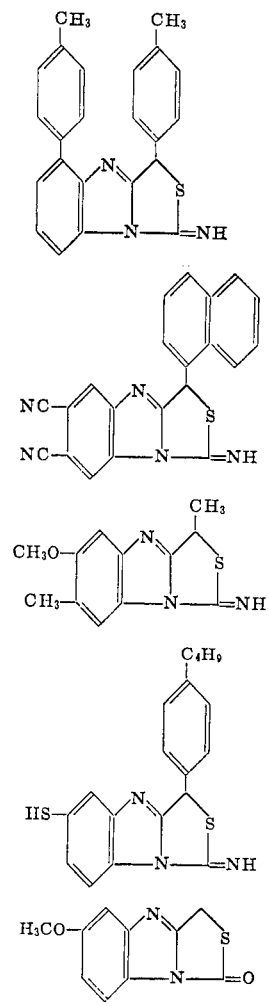

15. 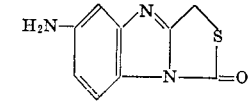

16. 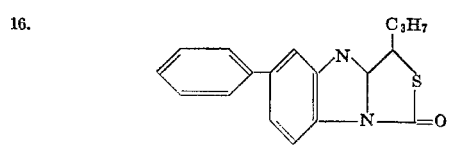

17. 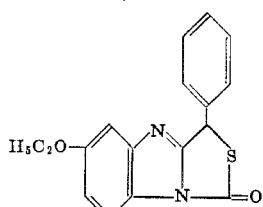

18. 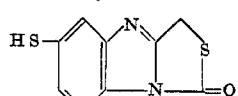

19. 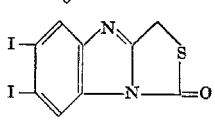

20. 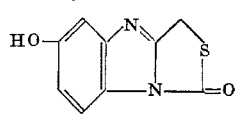

21. 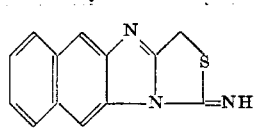

22. 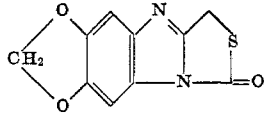

23. 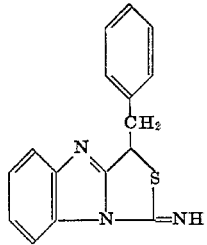

24. 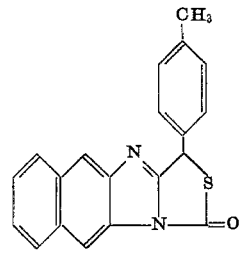

25. 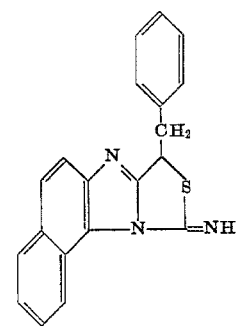

Compounds of formula I, where X is oxygen, are conveniently prepared from tricyclic compounds of formula I, where X is NH, in accordance with the following reaction:

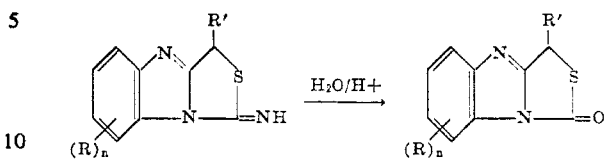

As indicated, the conversion is carried out in the presence of an acid. Dilute or concentrated aqueous acids such as any of the halogen acids, sulfuric acid, nitric acid, and/or phosphoric acid can be utilized. Preferred is hydrochloric acid. The conversion can be carried out at ambient temperature, although temperatures up to 100° C. can be employed. The conversion can be carried out in several minutes up to a period of several hours, depending upon the concentration of the acid and the temperature employed. The acid can be employed in a molar ratio to benzimidazoles of the formula I where X is NH of within the range of from about 800:1 to about 2:1 and preferably from about 650:1 to about 400:1.

Compounds of formula I where X is NH can be prepared by forming a thiocyanic acid ester of a benzimidazole of the structure II 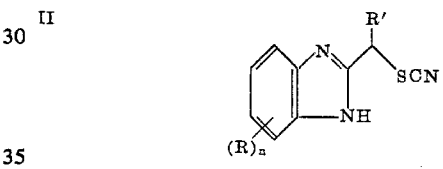

wherein R, R' and n are as defined hereinbefore, and then cyclizing the thiocyanic acid ester to form the tricyclic compounds of the invention (where X is NH). Intramolecular cyclization to form the tricyclic compounds of the invention is carried out by dissolving the thiocyanic acid ester (II) in a protic solvent, for example, a monohydric or polyhydric alcohol containing up to about five carbon atoms, such as methanol, ethanol, isoamyl alcohol or glycerol, or an aprotic solvent, such as dimethyl sulfoxide, dimethyl formamide, acetonitrile, ethyl acetate or diglyme, and heating the resulting solution at elevated temperatures ranging from about 35° to about 165°, for periods ranging from 1 to 24 hours.

Alternatively, tricyclic ring-structures of formula I where X is NH can be synthesized directly from 2-halomethyl benzimidazoles (III) and thiocyanic acid salts in suitable solvents at elevated temperatures:

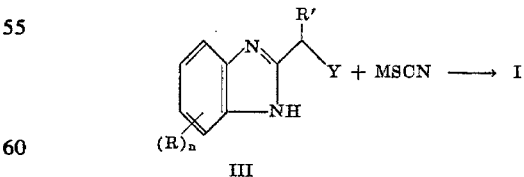

III where R and R' are as defined earlier, Y=Cl, Br, or I, and M is an alkali metal such as sodium, potassium or lithium, an alkaline earth metal such as calcium, barium or magnesium, or ammonium. Protic or aprotic solvents such as stated previously, can be advantageously employed at temperatures ranging from about 35° to about 100°, for periods of about 10 minutes to several hours.

The thiocyanic acid salts are employed in a molar ratio to the 2-halomethyl benzimidazoles (III) of within the range from about 1:1 to about 10:1 and preferably from about 1:1 to about 4:1.

The thiocyanic acid esters of benzimidazoles (II) can be prepared as described in U. S. application Ser. No. 17,320, filed Mar. 6, 1970, the disclosure of which is incorporated herein by reference.

The compounds of formula I form physiologically acceptable acid-addition salts with inorganic and organic acids. These acid-addition salts frequently provide useful means for isolating the products from reaction mixtures by forming the salt in a medium in which it is insoluble. The free base may then be obtained by neutralization, e.g., with a base such as sodium hydroxide. Then any other salt may again be formed from the free base and the appropriate inorganic or organic acid. Illustrative are the hydro-halides, especially the hydrochloride and hydrobromide which are preferred, sulfate, nitrate, phosphate, oxalate, tartrate, maleate, fumarate, pamoate, citrate, succinate, benzoate, ascorbate, methanesulfonate, benzenesulfonate, toluenesulfonate, and the like.

The compounds of this invention can be utilized as parasiticides and rodenticides, being particularly useful against *Crithidia fasciculata*. These compounds when utilized as parasiticides form the active ingredient in feed stuffs for cattle, hogs and chickens, being admixed with said feed stock in from 0.1 to 25 mg. per 100 kg weight of feed stuffs with the most preferred range being from about 5 to 10 mg. per 100 kg. of feed stuffs.

As anti-inflammatory agents, the compounds of this invention may be used topically in lieu of and in the same manner as cortisone in the treatment of acute inflammatory and allergic conditions of the eye, skin or mucosa, e.g., as suspension, ointment or cream containing about 0.1 to about 2.5 percent by weight, of a compound of formula I or physiologically acceptable salt thereof. In the rabbit or cow, for example, a 1 percent ointment is applied to the skin area 3 to 4 times daily.

The following Examples, in the opinion of the inventors, represent preferred embodiments of their invention:

EXAMPLE 1

1-Imino-1H,3H-thiazolo[3,4-a]benzimidazole

A mixture of 34 g. of 2-chloromethyl-benzimidazole, and 60 g. of ammonium thiocyanate in 1,000 ml. of methanol, is refluxed for one hour. The solution is evaporated to about half its volume and then chilled.

The product separates and is filtered off. Recrystallization from methanol yields 8.3 g. of pure product, m.p. 169°–170°.

| Anal. calc'd for $C_9H_7N_3S$: | C, 57.12; H, 3.73; N, 22.20 |
|---|---|
| Found: | C, 57.23; H, 3.96; N, 22.20. |

EXAMPLE 2

(a) Thiocyanic acid, 2-benzimidazoyl methyl ester

A solution of 8.4 g. of ammonium thiocyanate in 68 ml. of dimethyl sulfoxide, is treated with 9 g. of 2-chloromethyl-benzimidazole, and the clear solution is stirred for about 15 hours at about ambient temperatures. Water is then added until no further precipitate forms. The solid is filtered, washed with water, dissolved in dimethyl sulfoxide and reprecipitated with water. This reprecipitating process is repeated; upon drying at 25° C. under a vacuum of 0.01 mm/Hg, 4.2 g. of pure ester is obtained, m.p. 154°–155°.

| Anal. Calc'd for $C_9H_7N_3S$: | C, 57.20; H, 3.73; N, 22.23 |
|---|---|
| Found: | C, 57.10; H, 3.86; N, 21.86. |

(b) 1Imino-1H,3H-thiazolo[3,4-a]benzimidazole

A solution of 4.2 g. of thiocyanic acid, 2-benzimidazoyl methyl ester in 200 ml. of methanol is refluxed for one hour; cooling and water addition, until complete precipiatation is achieved furnishes 2 g. of 1-imino-1H,3H-thiazolo[3,4-a]benzimidazole.

EXAMPLE 3

1H,3H-Thiazolo[3,4-a]benzimidazole-3-one

To 195 ml. of hot concentrated hydrochloric acid (90°), there is added 7.8 g. of 1-imino-1H,3H-thiazolo-[3,4-a] benzimidazole. This mixture is stirred on a steam bath for 10 minutes. Then, the resulting solution is cooled and brought to pH 5 with concentrated ammonia. The formed precipitate is filtered and crystallized twice from ethyl acetate to yield 2.8 g. pure product, m.p. 212°–214°.

| Anal. Calc'd. for $C_9H_6N_2OS$: | C, 56.85; H, 3.18; N, 14.73 |
|---|---|
| Found: | C, 56.99; H, 3.34; N, 14.94. |

EXAMPLE 4

6Chloro-1-imino-1H,3H-thiazolo[3,4-a]benzimidazole

A mixture of 10 g. of 2-chloromethyl-5-chloro-benzimidazole and 8 g. of ammonium thiocyanate is dissolved in 200 ml. of dimethyl formamide and heated for 3.5 hours at 50°. Water is added until no further precipitate is formed. This mixture is allowed to stand overnight at room temperature; then the formed precipitate is crystallized twice from ethyl ether to yield 6 g. of pure product, m.p. 156°–158°.

| Anal. Calc'd for $C_9H_6ClN_3S$: | C, 48.33; H, 2.70; N, 18.78 |
|---|---|
| Found: | C, 48.55; H, 2.96; N, 18.70. |

EXAMPLE 5

1-Imino-3-methyl-11H,3H-thiazolo[3,4-a]benzimidazole

A mixture of 8.5 g. 2-(2-chloroethyl)benzimidazole [prepared according to the method of Roeder and Day, J. Org. Chem. 6 25 (1941)], 8.5 g. ammonium thiocyanate and 500 ml. of methanol is refluxed for one hour. The mixture is cooled and evaporated to dryness. The residue is extracted with chloroform, and dried over $MgSO_4$. Evaporation of the solvent furnishes an oil which is chromatographed on neutral alumina. Elution with ethyl ether:petroleum ether (BP 30–60) (2:1) furnishes 2 g. of pure product, m.p. 117°–118°.

| Anal. Calc'd: | C, 59.09; | H, 4.47; N, 20.67 |
|---|---|---|
| Found: | C, 59.25; | H, 4.46; N, 20.46. |

EXAMPLE 6

1-Imino-3-phenyl-1H,3H-thiazolo[3,4-a]benzimidazole

Utilizing the procedure of Example 1, but substituting α-phenyl-2-bromomethyl-benzimidazole for 2-chloromethyl-benzimidazole, the product recovered is 1-imino-3-phenyl-1 H,3H-thiazolo[3,4-a]benzimidazole.

EXAMPLE 7

1-Imino-6,7-dimethyl-1H,3H-thiazolo[3,4-a]benzimidazole

Utilizing the procedure of Example 1, but substituting 5,6-dimethyl-2-chloromethyl-benzimidazole for 2-chloromethyl-benzimidazole, the product recovered is 1-imino-6,7-dimethyl-1H,3H-thiazolo[3,4-a]benzimidazole.

EXAMPLES 8 to 13

Following the procedure of Example 1, but utilizing the compounds illustrated in Column A of Table I in lieu of 2-chloromethyl-benzimidazole and ammonium thiocyanate, the product formed has the structure of Column B:

TABLE I

| | A | | | | B | | |
|---|---|---|---|---|---|---|---|
| | Starting Materials | | | | Product | | |
| | 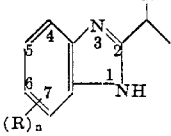 | | | MSCN | 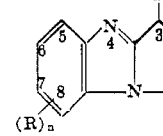 | | |
| Example Number | R | R' | Y | M+ | R | R' | X |
| 8 | 5,6-di-Cl | H | Cl | Na | 6,7-di-Cl | H | NH |
| 9 | 5,6-CH₂O₂ | C₆H₅CH₂ | Br | K | 6,7-CH₂O₂ | C₆H₅CH₂ | NH |
| 10 |  | H | Cl | Na |  | H | NH |
| 11 | 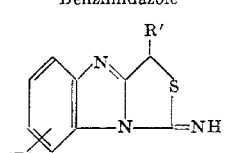 | H | Cl | NH₂+ | 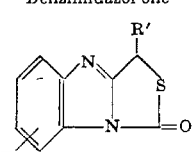 | H | NH |
| 12 | 5-NO₂ | H | Br | Li | 6-NO₂ | H | NH |
| 13 | 5,6-di-SCN | C₄H₉ | Br | K | 6,7-di-SCN | C₄H₉ | NH |

EXAMPLES 14 to 18

Following the procedure of Example 3, but utilizing the compounds illustrated in Column A of Table II in lieu of 1-imino-1H,3H-thiazolo[3,4-a]benzimidazole and the acid, the product formed has the structure of Column B.

TABLE II

| | A | | | B | |
|---|---|---|---|---|---|
| | Benzimidazole | | | Benzimidazol-one | |
| | (structure with =NH) | | | (structure with =O) | |
| Example number | R | R' | Acid | R | R' |
| 14 | 6-CH₃ | C₆H₅ | HBr | 6-CH₃ | C₆H₅ |
| 15 | 6-NO₂ | CH₃ | HClO₄ | 6-NO₂ | CH₃ |
| 16 | 6,7-CH₂O₂ | C₂H₅ | H₂SO₄ | 6,7-CH₂O₂ | C₂H₅ |
| 17 | 5-CN | C₆H₅CH₂ | HCl | 5-CN | C₆H₅CH₂ |
| 18 | 6-(CH₃)₂N | H | HI | 6-(CH₃)₂N- | H |

We claim:

1. Compounds of the formula

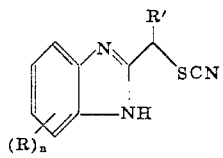

wherein R is selected from the group consisting of hydrogen, lower alkyl, aryl lower alkyl, lower alkoxy, lower alkylenedioxy, halo, nitro, hydroxy, amino, mono- or di-lower alkylamino, cyano, thiocyano, mercopto, phenyl lower alkyl, naphthyl, naphthyl lower alkyl, wherein phenyl and naphthyl are optionally substituted by lower alkyl, and benz or naphtho, optionally substituted by lower alkyl, R' is selected from the group consisting of hydrogen, lower alkyl, phenyl, naphthyl, phenyl lower alkyl, naphthyl lower alkyl, lower alkyl phenyl, and lower alkyl naphthyl, X is NH or oxygen and $n$ is 1 or 2.

2. A compound in accordance with claim 1, wherein R and R' are hydrogen and X is NH.

3. A compound in accordance with claim 1, wherein X is NH.

4. A compound in accordance with claim 1, wherein X is 0.

5. A process for preparing compounds as defined in accordance with claim 1 wherein X is NH, which comprises forming a solution of a compound of the structure

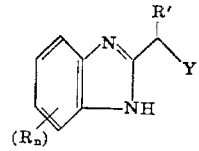

wherein R, R' and n are as defined in Claim 1, in a protic solvent or an aprotic solvent, heating the resulting solution at a temperature within the range of from about 35° to about 165° C. to form a benzimidazole as defined in claim 1.

6. A process for preparing compounds in accordance with claim 1, wherein X is NH, which comprises reacting a 2-halomethyl benzimidazole of the structure

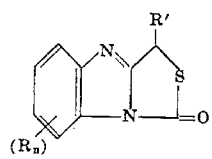

wherein R, *n* and R' are as defined in claim 1, and Y is Cl, Br or I, with the thiocyanic acid salt of the structure

MSCN wherein M is an alkali metal, alkaline earth metal or ammonium, at a temperature within the range of from about 35° to about 100° C.

7. A process for preparing a benzimidazol-one in accordance with claim 1, which comprises mixing a benzimidazole as defined in claim 1 with an aqueous inorganic acid at a temperature within the range of from about ambient temperature up to about 100° C. to form a compound of the structure

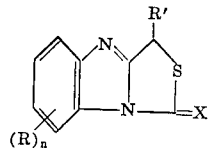

wherein R, *n* and R' are as defined in claim 1.

* * * * *

UNITED STATES PATENT OFFICE
CERTIFICATE OF CORRECTION

Patent No. 3,665,007        Dated   May 23, 1972

Inventor(s)   Rudiger D. Haugwitz et al.

It is certified that error appears in the above-identified patent and that said Letters Patent are hereby corrected as shown below:

Column 3, formula 16, that portion of the formula reading

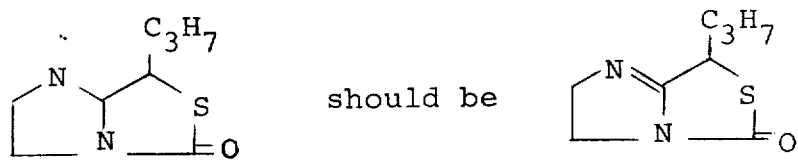

Column 7, Table I, Example 11, under the column M+, "$NH_2^+$" should read --$NH_4^+$--. Column 7, claim 1, in the formula,

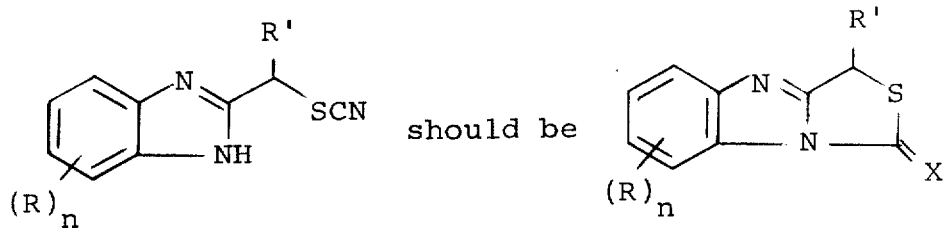

UNITED STATES PATENT OFFICE
CERTIFICATE OF CORRECTION

Patent No. 3,665,007                    Dated May 23, 1972

Inventor(s) Rudiger D. Hauqwitz et al.

It is certified that error appears in the above-identified patent and that said Letters Patent are hereby corrected as shown below:

Column 8, claim 5, in the formula

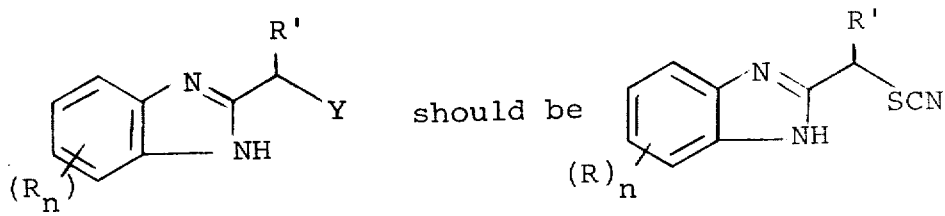

Column 8, claim 6, in the formula

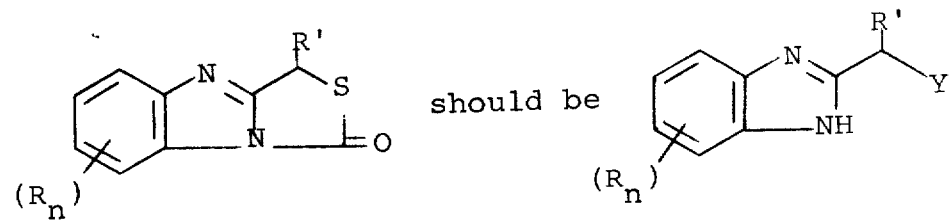

UNITED STATES PATENT OFFICE
CERTIFICATE OF CORRECTION

Patent No. 3,665,007　　　　　　　　Dated May 23, 1972

Inventor(s) Rudiger D. Hauqwitz et al.

It is certified that error appears in the above-identified patent and that said Letters Patent are hereby corrected as shown below:

Column 10, claim 7, in the formula

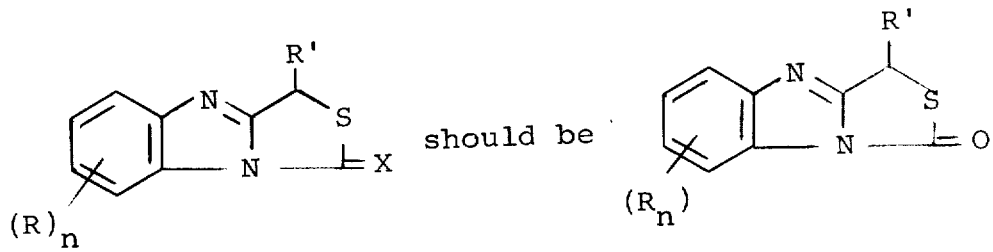

Column 7, claim 1, line 67, "mercopto, phenyl lower alkyl" should read --mercapto, phenyl, phenyl lower alkyl--

Signed and Sealed this

Thirteenth Day of June 1978

[SEAL]

Attest:

RUTH C. MASON
Attesting Officer

DONALD W. BANNER
Commissioner of Patents and Trademarks